United States Patent
Guo

(10) Patent No.: US 11,648,489 B1
(45) Date of Patent: May 16, 2023

(54) AUTOMATIC DISTILLER AND INFUSER

(71) Applicant: Liang Guo, Monrovia, MD (US)

(72) Inventor: Liang Guo, Monrovia, MD (US)

( * ) Notice: Subject to any disclaimer, the term of this patent is extended or adjusted under 35 U.S.C. 154(b) by 0 days.

(21) Appl. No.: 17/808,294

(22) Filed: Jun. 22, 2022

(51) Int. Cl.
*B01D 11/02* (2006.01)
*B01D 3/38* (2006.01)
*B01D 3/42* (2006.01)

(52) U.S. Cl.
CPC ............ *B01D 11/0219* (2013.01); *B01D 3/38* (2013.01); *B01D 3/42* (2013.01); *B01D 11/02* (2013.01)

(58) Field of Classification Search
CPC . B01D 11/02; B01D 11/0207; B01D 11/0215; B01D 11/0219; B01D 3/38
See application file for complete search history.

(56) References Cited

U.S. PATENT DOCUMENTS

2014/0001027 A1*  1/2014  Balass ................. A23F 3/18
203/1

* cited by examiner

*Primary Examiner* — Jonathan Luke Pilcher
(74) *Attorney, Agent, or Firm* — Xi Chen

(57) ABSTRACT

An herbal distillation device includes a herb chamber with perforated holes for holding herbs and a closed heated boiling chamber with openings at the side for a steam outlet. The herbal distillation device further includes an electric air-cooled condensation chamber which connects to the boiling chamber.

18 Claims, 4 Drawing Sheets

AUTOMATIC DISTILLER AND INFUSER

TECHNICAL FIELD

The present invention relates to devices and methods for extracting volatile phytochemicals from herbs.

BACKGROUND ART

Herbal extracts collected through steaming has very positive effect on the skin. They stimulate the metabolism of the skin and at the same time generate soothing and comforting effect on the human body.

Existing herbal distillation devices are cumbersome to use and lack the multifunctionalities that a consumer would like to have. Therefore, a need has long existed for an improved herbal distillation device that may have a simple design yet versatile functions. The present invention is able to meet this need.

SUMMARY OF THE INVENTION

The present invention is directed to a distillation device [100] comprising: a boiler and a controller, wherein said boiler contains a heating element for creating steam [12]; a water storing chamber sitting on top of the heating element for storing water [40]; a herb chamber with perforated holes for holding herbs [80]; and an air-cooled condenser [200] and an inlet [500] connecting the boiler and the air-cooled condenser.

In one embodiment, the above distillation device may further comprise a temperature control. Such temperature control can be adjusted to set the temperature inside the water storing chamber to a temperature that is suitable for water boiling, alcohol evaporation, or infusion.

In one embodiment, the water boiling temperature of the above distillation device is set to be 100 degree Celsius under normal ambient pressure.

In one embodiment, the alcohol boiling temperature of the above distillation device is set to be 78 degree Celsius under normal ambient pressure.

In one embodiment, the infusion temperature of the above distillation device is set to be 60 degree Celsius.

In one embodiment, the controller of the above distillation device comprises a timer for controlling operation time. In another embodiment, the above distillation device further comprises one or more safety features.

In one embodiment, the safety features of the above distillation device include a pressure relief valve and/or temperature sensors.

In one embodiment, the communication unit of the above distillation device can send signals to a user interface located on the distillation device or to a smartphone app.

In one embodiment, the user interface of the above distillation device has one or more items which are selected from a group comprising: a buzzer, LED lights, and a screen.

In one embodiment, the sensors of the above distillation device comprise a temperature sensor on the boiler and a temperature sensor on the condenser.

The present invention is also directed to a method for extracting volatile phytochemicals from herbs using the above described distillation device, wherein water is filled in the device to no more than its maximal level which is lower than the bottom of the herb chamber and the herbs are placed in the herb chamber, and wherein the heating element is heated to make the internal temperature of the water storing chamber to reach the water boiling temperature, and wherein the volatile phytochemicals is collected through condensation.

In the above method, condensation is achieved by cooling the steam generated in the boiler through the air-cooled condenser.

The present invention is also directed to a method for extracting ethanol alcohol from tincture using the distillation device of the above described distillation device, wherein a tincture containing a mixture of ethanol alcohol and herbs is filled in the boiler to no more than its maximal level, and wherein the heating element is heated to make the internal temperature of the water storing chamber to reach the ethanol alcohol boiling temperature, and wherein the vaporized ethanol alcohol is collected through condensation.

In one embodiment, the condensation of the above method is accelerated by cooling the steam generated in the boiler through the air-cooled condenser.

The present invention is further directed to a method for extracting oil-soluble phytochemicals from herbs using the above described distillation device, wherein a mixture of carrier oil and herb is filled into the infusion storage container to no more than its maximal level, and wherein the heating element is heated to make the internal temperature of the water storing chamber to reach the infusion temperature, and wherein the oil-soluble phytochemicals is extracted into carrier oil which becomes infused oil.

In one embodiment, the infused oil made during the process is collected as a product for use after the infusion extraction process is completed, and herbs are drained out as waste.

The present invention is further directed to an electric air-cooled condenser comprising: a cooling chamber, a cooling metal tubing which has an inlet and an outlet, and a fan, and therein said cooling chamber contains no liquid cooling media.

In one embodiment, the cooling metal tubing of the above electric air-cooled condenser is bare metal tubing.

In one embodiment, the cooling metal tubing of the above electric air-cooled condenser has grills on the outside of the tubing to increase its cooling area.

In one embodiment, the fan of the above electric air-cooled condenser is powered by electricity.

In one embodiment, the electric air-cooled condenser is a standalone working unit which comprises a control panel for controlling the speed of fan.

In one embodiment, the controller of the above electric air-cooled condenser comprises: a control unit, a communication unit, a user interface, and multiple sensors.

In one embodiment, the electric air-cooled condenser has a controller which controls the fan in the condenser.

BRIEF DESCRIPTION OF THE DRAWINGS

The foregoing features of embodiments will be, more readily understood by reference to the following detailed description, taken with reference to the accompanying drawings, in which.

DETAILED DESCRIPTION OF THE INVENTION

Distillation is an extraction process. Volatile phytochemicals are separated from herb with steam and then they are condensed into liquid. During distillation, essential oil and hydrosol can be made from herbs. Distiller is an equipment which helps extract from herbs by distillation. Generally there are two types of distillation: steam distillation and water distillation. During steam distillation, herbs stay on top of water so steam will go through the herb bed while boiling and then steam will extract volatile phytochemicals from the herbs. The steam carrying these essential compounds is then condensed into liquid through condensation. During water distillation, herbs are mixed with water before heating up. Volatile phytochemicals will vaporize with steam and then they are condensed into liquid through condensation.

Distillation can also be used to separate ethanol alcohol from tincture. Ethanol alcohol has lower boiling temperature than water. Under normal pressure, boiling temperature of ethanol alcohol is 78 degree Celsius while water is 100 degree Celsius. Low temperature boiling, such as at 80 degree Celsius, helps separate ethanol alcohol efficiently and reduce loss of volatile phytochemicals from tincture.

Infusion is a solvent extraction process. Herbs can be extracted with oil, such as olive oil and sweet almond oil, which is also called carrier oil. Oil soluble phytochemicals can be extracted from herbs and dissolved into the carrier oil. The carrier oil containing extracted phytochemicals is called infused oil. The infused oil can be directly consumed in food preparation or be used as functional ingredient to make skincare products. Infusion process can be accelerated at elevated temperature such as 60 degree Celsius. Under normal temperature, infusion may take weeks of time to finish, but under the elevated temperature, time can be significantly reduced to hours.

The device created in this invention has three working modes:
1. Steam distillation under regular boiling condition;
2. Low temperature distillation to remove alcohol from tincture; and
3. Infusion at elevated temperature.

Working Mode 1: Steam Distillation Under Boiling

Figure 1:
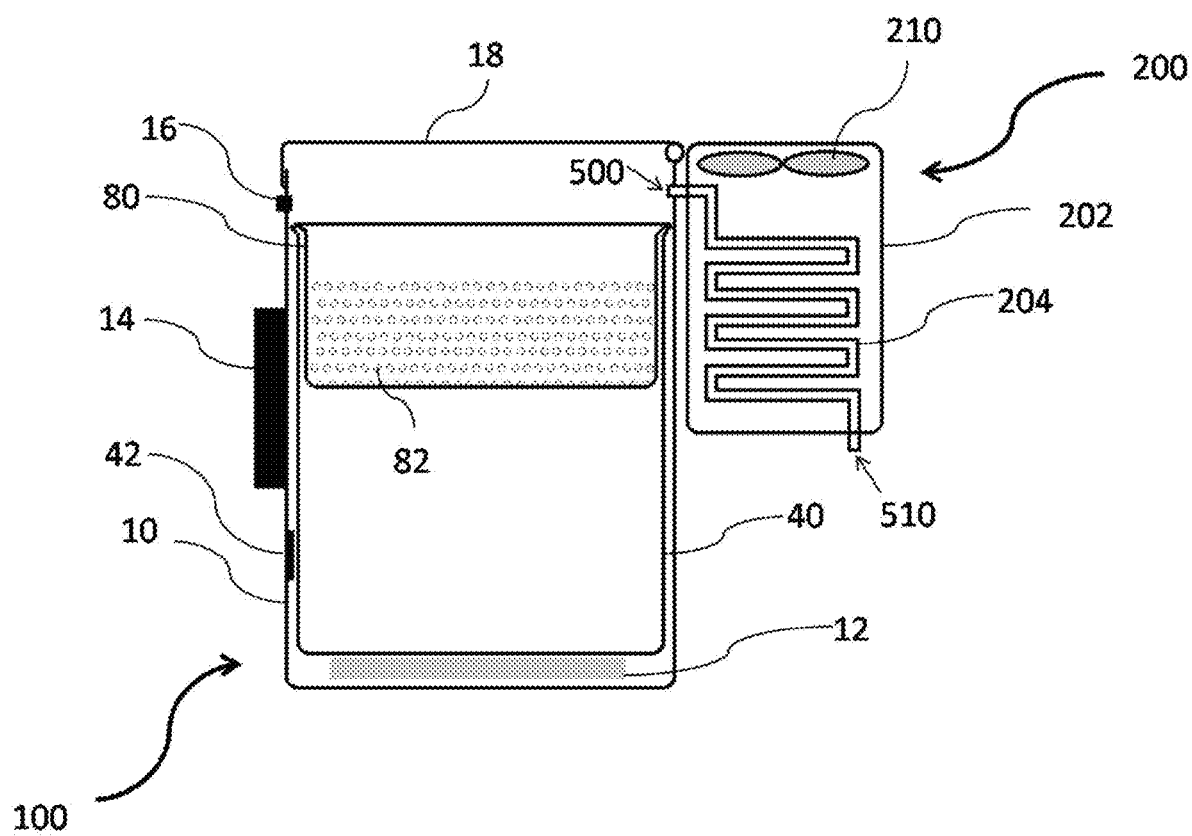
FIG. 1 is a schematic drawing of a device under working mode of automatic steam distillation function.

In one embodiment, the device of the present invention is program controlled to extract volatile phytochemicals from herbs. FIG. 1 shows the schematic drawing of steam distillation. The boiler, 100, has a heating element, 12, enclosed in the casing, 10. The heating element can be a coil, a disk, or a filament. A chamber, 40, sits on top of the heating element. During preparation, water is filled into the chamber, 40, up to its maximal level which is lower than the bottom of the steamer, 80. Herbs, such as rose flower, *eucalyptus* leaves, ginger root, or cinnamon bark, are placed into the steamer, 80. Through perforated holes, 82, on the steamer, 80, steam generated during boiling of water will pass through the herb bed. The steam will carry the extracted volatile phytochemicals and goes into a condenser, 200, through inlet, 500, of condensation coil, 204. With help of a fan, 210, the steam can be cooled down and condensed into liquid due to the air ventilation inside the condenser, 200. In one embodiment, the distillation process can be completed after a set period of time. In some embodiment, said period of time is 15, 30, 45, 60, 75, 90, 105, 120, 135, 150, 165, 180, 195, 210, 225, or 240 minutes, etc. In one embodiment, the distillation process is terminated after the collected distillate volume reached a set level. In some embodiments, the set level is 100, 150, 200, 250, 300, 400, 500, 600, 700, 800, 900, or 1000 ml, etc.

The air flows into the chamber of condenser, 200, from the bottom and exit from the top, or runs in an opposite way. In one embodiment, there are perforated holes on the side wall of condenser chamber, 202. Air flows in through the side of the chamber and then exits from the top of the chamber. In another embodiment, there are opened slots at the bottom of the condenser chamber. Air flows in from the bottom and leaves from the top.

The boiler chamber lid, 18, can be opened up for setting up distillation or cleaning after finished. The steamer, 80, can be taken out for preparing distillation by adding herbs into it, or cleaning after the distillation. In one embodiment, the steamer has one or more handles so it can be easily moved in and out.

In one embodiment, several safety features are placed on the boiler. A pressure relief valve, 16, on the boiler chamber, 10, can relieve pressure when the internal pressure goes beyond a set value. Temperature sensor, 42, can sense the working temperature in order to avoid overheat. When there is no water left in the boiler chamber, 40, temperature will go up and the temperature sensor, 42, read a value above the set value, the controller, 14, can stop the work of heating element and send signal onto the interface. The signal includes but not limited to, beeping noise, flashing light, or message on smart phone. The controller, 14, works as user interface. In one embodiment, the user interface has button and screen. User can input control command through one or more of such buttons. The screen can indicate how to set up the process and display information showing whether the distillation runs normally or there are errors if problems were found by sensors. In another embodiment, the screen is a touch screen. In another embodiment, the interface is controlled by a smart phone through Bluetooth or WIFI. A smartphone app can be used to set up the distillation device, monitor the working status of the device, and notify the user of errors occurred during the distillation process or completion of the distillation process.

Working Mode 2: Low Temperature Distillation to Remove Alcohol from Tincture

Tincture is made by mixing high-proof ethanol alcohol with herbs for extraction. Distillation is an effective way to reduce alcohol concentration from a prepared tincture. In one embodiment, tincture is added into the boiler chamber, 40. The controller, 14, can manage the temperature to reach the boiling temperature of ethanol alcohol, which is 78 degree Celsius under normal pressure. In one embodiment, an ambient pressure sensor which is installed on the controller, 14, can help adjust working temperature to compensate change of its boiling temperature due to different ambient pressure, for example, due to change of altitude. Alcohol steam will pass into condenser, 200, through inlet of the cooling coil, 500.

In one embodiment, ethanol alcohol steam is condensed back into liquid through cooling by air ventilation generated by fan, 210. Concentrated ethanol alcohol can be collected at the outlet of coil, 510. The recycled distillate ethanol alcohol can be reused for making new tincture. In one embodiment, distillation process can be stopped after a set period of time under the working temperature. In some embodiment, said period of time is 15, 30, 45, 60, 75, 90, 105, 120, 135, 150, 165, 180, 195, 210, 225, or 240 minutes, etc. In another embodiment, distillation process can be finished after the collected distillate ethanol volume reached the set level. Its some embodiment, said volume is 50, 100, 150, 200, 250, 300, 350, 400, 450, 500, 550, 600, 650, 700, 750, 800, 850, 900, 950 or 1000 ml, etc. In another embodiment, distillation process is complete after the residual tincture reached targeting ethanol concentration. In one embodiment, said targeting ethanol concentration is 0, 5, 10, 15, 20, 25, 30, 35, or 40 percent, etc. In one embodiment, the targeting ethanol concentration is detected and measured by an ethanol concentration sensor.

Controller, 14, uses the temperature sensor, 42, to accurately manage its working temperature. In one embodiment, when the temperature sensor read a value above the set value, the controller, 14, is powered off. In another embodiment, the controller reduces the working power of heating element and then restarts heating or powers back up if the temperature drops below a set value. The working temperature can be accurately controlled at the set point. In one embodiment, when the process duration reached the set value, the heating element, will be powered off and a signal will be sent onto the interface. The signal includes but is not, limited to, beeping sound, flashing light signal, or message on smart phone. The controller, 14, works as a user interface. In one embodiment, the user interface has one or more buttons and a screen. User can set up the input controlling threshold through pressing buttons. The screen can display the status of the distillation process, such as whether the process runs normally, or display errors if problems have occurred and identified by sensors, or display that the end of the process has been reached. In another embodiment, the interface has a touch screen. In another embodiment, the interface communicates to a smart phone through Bluetooth or WWI. A smart phone app can be used to set up the running parameters, to monitor device's running status, and to notify the user of errors occurred during distillation, or to show the completion of process.

Mode 3: Infusion at Elevated Temperature

Figure 3:
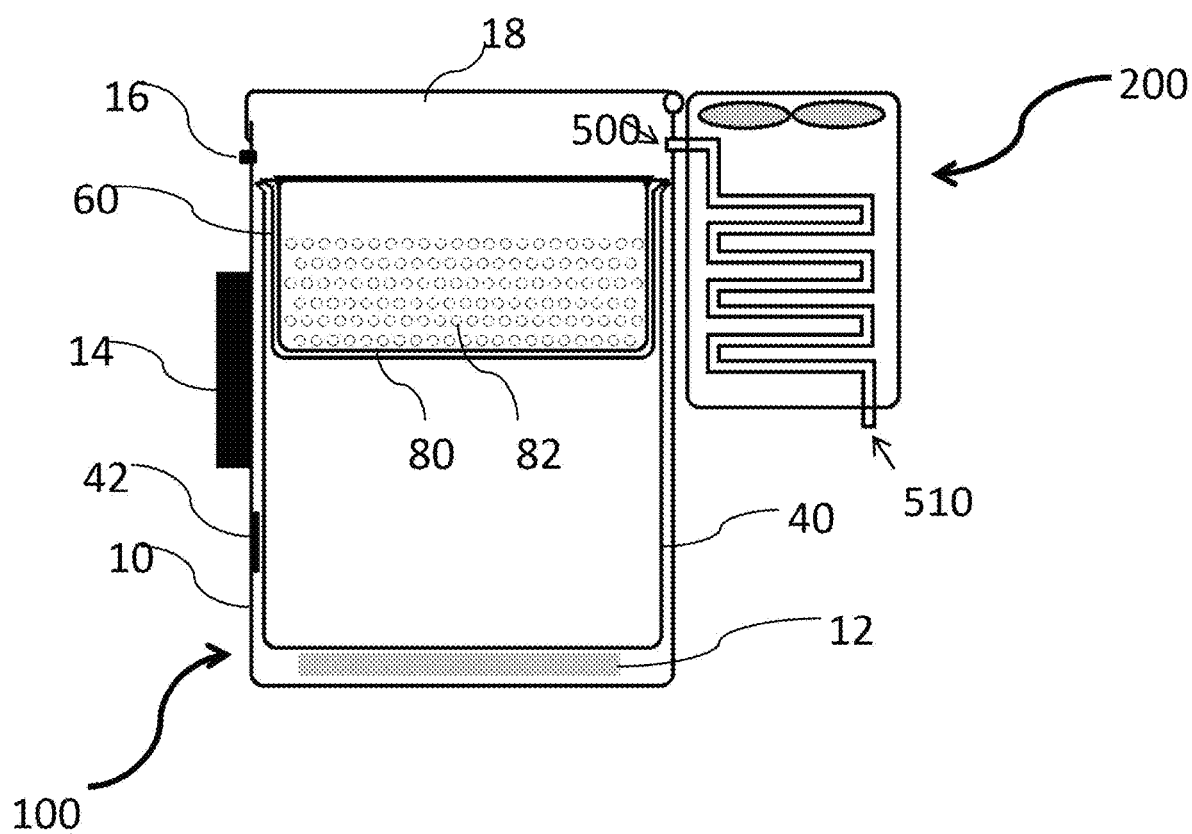
FIG. 3 is a schematic drawing of the device under working mode of elevated temperature infusion.

FIG. 3 shows the schematic drawing of a device in one embodiment of working mode of elevated temperature infusion. In one embodiment, the boiler chamber is empty. Carrier oil, for example olive oil or sweet almond oil, is added into the infusion chamber, 60. Herbs are placed into the herb chamber, 80, which can be used as steamer under distillation. Carrier oil can mix with herbs during infusion and can be strained out through the perforated holes, 82, after infusion.

Controller, 14, uses the temperature sensor, 42, to accurately manage its working temperature. In one embodiment, infusion process is stopped after a set period of time under the controlled working temperature. In some embodiment, said period of time is 1, 2, 3, 4, 5, 6, 7, 8, 9, 10, 11, 12, 13, 14, 15, 16, 17, 18, 19, 20, 21, 22, 23, or 24 hours, etc. When the temperature, as detected by a sensor, reaches a value above a set value, the controller, 14, will power off or reduce working power of heating element and then restarts heating or power back up if temperature drops below the set value. Therefore, the working temperature can be accurately controlled to maintain at the set point. When the process time reaches the set value, the heating element will be powered off and a signal will be sent onto the interface. The signal includes but is not limited to, beeping sound, flashing light signal, or message on smart phone. The controller, 14, works as a user interface. In one embodiment, the user interface has one or more buttons and a screen. User can set up the infusion process through pressing buttons. The screen displays the setting input and the running status such as whether the process runs normally or reporting errors if problems are identified by the sensors. In another embodiment, the user interface is a touch screen. In another embodiment, the user interface can communicate to a smart phone through Bluetooth or WIFI. A smart phone app can be used to finish set up, monitor device's running status, and notify the user of errors occurred during distillation or completion of the process.

EXAMPLES

Example 1: Automatic Hydrosol Distiller

As shown in FIG. 1, one embodiment of the invention is directed to a system includes a boiler and condenser. In one example, herbs, for example lavender buds, were placed into the steamer, 80, and filtered water was added into boiler, 40. The water level stayed below its maximal level. After the equipment was turned on, water was heated up to boiling and steam went out and passed through the lavender buds bed in the steamer by going through the perforated holes, 82. Under the high temperature extraction, volatile phytochemicals, for example linalool, linalyl acetate, etc. were extracted. The extracted phytochemicals with steam was condensed into liquid form in the condenser by air ventilation cooling as illustrated in Example 4. These phytochemicals exist in distillate products including essential oil and/or hydrosol. The distillate products such as hydrosol can be used as skin care, aromatherapy, house cleaning, etc.

Example 2: Automatic Alcohol Removal from Tincture

Figure 2:
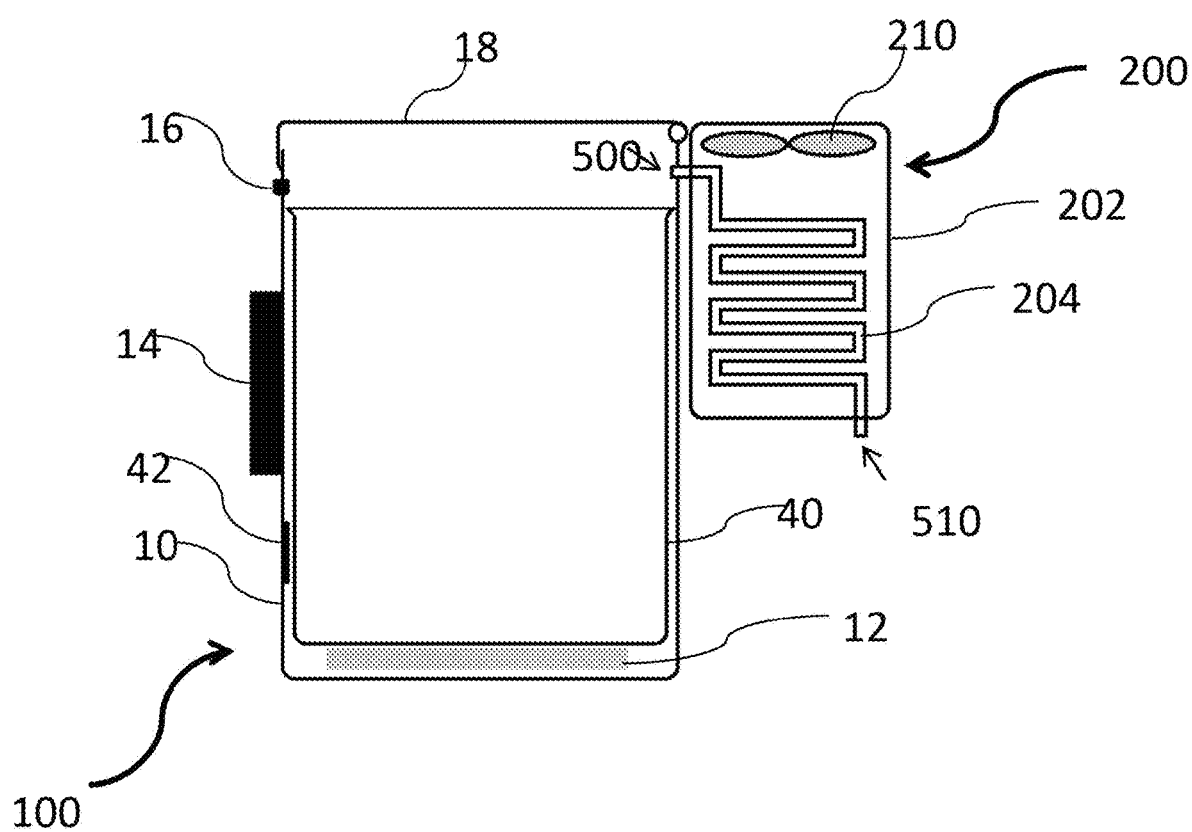
FIG. 2 is a schematic drawing of a device under working mode of low temperature distillation.

Tincture is a mixture of high proof alcohol and herbs. For example, reishi mushroom tincture is made by 95% (190 proof) alcohol. Such high proof alcohol limits its consumption especially for user groups such as people at young age, or alcohol sensitive people. As shown in FIG. 2, one embodiment of the invention is directed to a system includes a boiler and condenser. In this example, tincture was placed in the boiler chamber, 40. After the distiller was turned on at alcohol removal working mode, the boiler heated up the tincture to a temperature of alcohol boiling point, for example 78 degree Celsius under normal pressure. At this lower temperature, unlike water boiling point which is 100 degree Celsius under normal pressure, alcohol was preferentially removed instead of water. Alcohol vaporized and was condensed back into liquid in the condenser. Such low temperature distillation improved alcohol removal efficiency and also minimized loss of phytochemicals which is dissolved in the tincture.

Example 3: Automatic Infused Oil Making

As shown in FIG. 3, the present invention supports infusion function. By choosing this function, the system is used to conduct an elevated temperature infusion. In this example, herbs and carrier oil were mixed together and added into the infused oil container. For example, rosemary leaves were mixed with olive oil in the container. After the machine was turned on under the infusion working mode, the boiler temperature was raised to a set point of 60 degree Celsius. This elevated temperature has shortened the duration for making the infused oil. When the set time is reached, for example 24 hours, the equipment sent notice to the user to notify that the infusion process is completed. The infused oil container was taken out and then the herb basket was taken out of the oil collector. Oil was drained out through the perforated holes. The spent herbs were left in the herb basket and were later disposed as a waste after infusion. The collected oil was the infused oil. This oil can be used to be consumed directly such as salad dressing or to make other products such as lotion, soap or candy. Under this infusion working mode, the condenser won't be turned on since there is no evaporation.

Example 4: Electric Air-Cooled (Non-Water) Condenser

Figure 4:
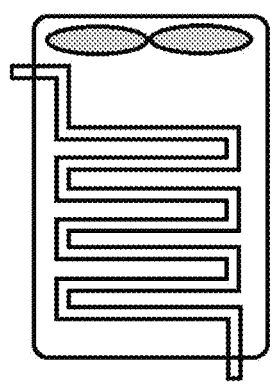
FIG. 4 is a schematic drawing of the electric air-cooled condenser.

As shown in FIG. 4, the condenser of the present invention can be a standalone unit to work with other distillers so as to work under no water cooling mode. Most of commercial distillers are working with water-cooled condenser. Cooling water either stays in the condenser or is circulated in and out of condenser so as to cool down the steam into liquid as product. For water cooling, water is used as a cooling agent for condensation. Unlike a conventional water-cooled condenser, the condenser of the present invention runs with, air cooling with electricity and thus it doesn't need water as cooling agent. Thus, the cooling process of this invention is made easier and fits more working conditions. The condenser in the present invention was connected with a boiler from another distiller either by using a silicon tubing or with a connector. Therefore, the distiller connected with this condenser works without using any cooling water agent.

What is claimed is:

1. A distillation device [100] comprising:
    a. a boiler containing:
        i. a heating element [12];
        ii. a water storing chamber [40] for storing water, wherein the water storing chamber sits atop the heating element; and
        iii. an herb chamber [80] for holding herbs, wherein the herb chamber comprises perforated holes; and
    b. a standalone air-cooled condenser [200] which is removable from the distillation device and an inlet [500] connecting the boiler and the air-cooled condenser; and
    c. a controller;
    wherein said boiler comprises a temperature controller for controlling a temperature of the boiler; and
    wherein said temperature controller is adjustable and is configured to set a temperature inside the water storing chamber to a temperature that is suitable for water boiling, a temperature that is suitable for separating ethanol from tincture, and a temperature that is suitable for infusion.

2. The distillation device of claim 1, wherein said temperature that is suitable for water boiling is 100 degree Celsius under normal ambient pressure.

3. The distillation device of claim 1, wherein said temperature that is suitable for separating ethanol from tincture is 78 degree Celsius under normal ambient pressure.

4. The distillation device of claim 1, wherein said temperature that is suitable for infusion is 60 degree Celsius.

5. The distillation device of claim 1, wherein said controller comprises a timer for controlling operation time.

6. The distillation device of claim 1, wherein said distillation device further comprises one or more safety features.

7. The distillation device of claim 6, wherein said safety features include a pressure relief valve and/or temperature sensors.

8. The distillation device of claim 1, wherein said controller comprises: a control unit, a communication unit, a user interface, and multiple sensors.

9. The distillation device of claim 8, wherein said controller controls the heating element in the boiler and a fan in the condenser.

10. The distillation device of claim 8, wherein said communication unit is capable of sending signals to the user interface or to a smartphone app.

11. The distillation device of claim 8, wherein said user interface is selected from a group comprising: a buzzer, LED lights, and a screen.

12. The distillation device of claim 8, wherein said sensors comprise a temperature sensor on the boiler and a temperature sensor on the condenser.

13. A method for extracting volatile phytochemicals from herbs using the distillation device of claim 1, the method comprising:
    filling water in the device to no more than a maximal level of the device, wherein the maximal level is lower than a bottom of the herb chamber;
    placing the herbs in the herb chamber;
    heating the heating element to make the temperature inside the water storing chamber reach the temperature that is suitable for water boiling; and
    wherein the volatile phytochemicals are collected through condensation.

14. The method of claim 13, wherein said condensation is achieved by cooling a stream generated in the boiler through the air-cooled condenser.

15. A method for extracting ethanol alcohol from tincture using the distillation device of claim 1, the method comprising:
    filling a tincture containing a mixture of ethanol alcohol and herbs in the boiler to no more than maximal level of the boiler;
    heating the heating element to make the temperature inside the water storing chamber reach the temperature that is suitable for separating ethanol from tincture; and
    collecting vaporized ethanol alcohol through condensation.

16. The method of claim 15, wherein said condensation is accelerated by cooling a stream generated in the boiler through the air-cooled condenser.

17. A method for extracting oil-soluble phytochemicals from herbs using the distillation device of claim 1, the method comprising:
    filling a mixture of carrier oil and herbs into the boiler to no more than a maximal level of the boiler;
    heating the heating element to make the temperature inside the water storing chamber reach the temperature that is suitable for infusion; and
    wherein extracting the oil-soluble phytochemicals into carrier oil which becomes infused oil.

18. The method of claim 17, wherein said infused oil is collected as a product for use after an infusion extraction process is completed and herbs are drained out as waste.

* * * * *